(12) United States Patent  
Davidian

(10) Patent No.: US 6,644,505 B2
(45) Date of Patent: Nov. 11, 2003

(54) HAND-HELD SELF DEFENSE DEVICE

(76) Inventor: Chaim Davidian, P.O. Box 208, Batzra 60944 (IL)

( * ) Notice: Subject to any disclaimer, the term of this patent is extended or adjusted under 35 U.S.C. 154(b) by 0 days.

(21) Appl. No.: 10/093,695

(22) Filed: Mar. 11, 2002

(65) Prior Publication Data

US 2002/0113091 A1 Aug. 22, 2002

Related U.S. Application Data

(63) Continuation-in-part of application No. 09/595,883, filed on Jun. 20, 2000, now abandoned.

(51) Int. Cl.[7] ................................................. G01F 11/00
(52) U.S. Cl. ..................... 222/1; 222/79; 222/153.13; 222/211; 222/212
(58) Field of Search ..................... 222/1, 79, 153.13, 222/209, 211, 212, 481.5, 548, 556, 560

(56) References Cited

U.S. PATENT DOCUMENTS

| | | | | |
|---|---|---|---|---|
| 3,255,933 A | * | 6/1966 | Martin | 222/209 |
| 3,474,936 A | * | 10/1969 | McDonnell | 222/211 |
| 4,024,992 A | * | 5/1977 | Schmid | 222/211 |
| 4,640,440 A | * | 2/1987 | Ford et al. | 222/190 |
| 5,219,096 A | * | 6/1993 | Wing | 222/79 |
| 5,303,851 A | * | 4/1994 | Libit et al. | 222/207 |
| 5,328,060 A | * | 7/1994 | Kersten et al. | 222/209 |
| 5,549,220 A | * | 8/1996 | Whalen | 222/1 |
| 5,638,994 A | * | 6/1997 | Libit et al. | 222/207 |
| 6,006,952 A | * | 12/1999 | Lucas | 222/211 |
| 6,264,073 B1 | * | 7/2001 | Good et al. | 222/464.4 |

* cited by examiner

Primary Examiner—Joseph A. Kaufman
(74) Attorney, Agent, or Firm—Mark M. Friedman

(57) ABSTRACT

A self-defense device and a method of use, the device including: (a) a chamber having: (i) a rigid outer wall section, and (ii) a flexible outer wall section attached to the rigid outer wall section; (b) an ejection assembly fixed inside and extending through the outer wall of the chamber, the ejection assembly including: (i) a tube extending through the chamber, and fluidly communicating therewith; (ii) a nozzle attached to an upward end of the tube and extending through the chamber, and (c) a noxious fluid disposed within the chamber, wherein the chamber is designed and constructed so as to be completely filled by the fluid, and wherein external pressure exerted upon the flexible outer wall section increases an internal pressure of the chamber, such that the fluid is forcefully ejected out of the device through the ejection assembly and out of the nozzle.

18 Claims, 2 Drawing Sheets

HAND-HELD SELF DEFENSE DEVICE

This is a continuation-in-part of U.S. patent application Ser. No. 09/595,883 filed Jun. 20, 2000 now abandoned.

FIELD AND BACKGROUND OF THE INVENTION

The present invention relates to self-defense devices and more specifically, to hand-held self-defense devices that squirt a stream or spray of noxious fluid at a potential assailant. The invention includes a rigid section and a flexible section which protect and enclose the noxious fluid, and is configured to maximize comfort and intuitiveness of hand-held use while minimizing the probability of accidental ejection of the fluid.

Self-defense devices cover a wide range of threatening situations and are, by manufacture, individually suited to cover various sectors within a parameter space defined by axes such as lethality, level of user training, size and portability, ease of concealment, safety, accuracy and range of fire, ammunition storage capacity, and others. This specialization makes some devices more suitable for professional security personnel and others more suitable for personal use by civilians. The category of self-defense devices for personal use is characterized by low levels of lethality and requisite user training, small size and easy concealment, high safety levels, and poor-to-medium accuracy and range of fire. In addition, the possibility of facile one-handed operation is a definite advantage for such a device.

While the prior art discloses solutions that optimize certain combinations of the above parameters, no one solution is specifically configured to optimize all parameters necessary for personal self-defense use by civilians, as is evident from the following exemplary prior art devices.

One self-defense device is a mace spray canister, which offers the potential victim a way of disabling a potential assailant. However, available personal-use aerosol mace devices have very low accuracy and range of fire, and are difficult to operate with one hand. In addition, the pressurized contents are hazardous, particularly during air travel, and also pose disposal hazards at the end of the product life cycle.

U.S. Pat. No. 5,219,096 to Wing discloses a squirt gun in handgun form in which the projection force and fluid storage are combined in a collapsible bulb forming the butt of the pistol. In addition to the disadvantage of gun-like appearance, this design leaves the compressible portion of the mechanism exposed to external pressure and thus susceptible to accidental operation. In addition, operation of the device is awkward and requires at least two hands to release the safety, aim the device and squeeze the flexible bulb.

U.S. Pat. No. 3,087,481 to Foster discloses a toy gun for firing lightweight balls, or alternatively, a fluid, when the flexible butt portion of the gun is squeezed. This device also suffers from the disadvantage of gun-like appearance. Also, the flexible container protrudes from the body of the device and is thus exposed to external pressure from nearly every direction. While not detrimental to its use as a toy, these aspects reduce the safety and ease of concealment necessary for use as a self-defense device.

While the overall size of a personal civilian self-defense device must be relatively small, the section of the device containing the active ammunition should be as capacious as possible within this constraint. Many of the devices disclosed in the above patents do not provide enough capacity for repeated discharges of the device as necessary to repel an assailant, particularly in situations in which the initial discharge misses the mark, or in situations in which several assailants are present.

Outside of the realm of devices specifically designed for self-defense purposes, there are a number of devices for containing and dispensing fluids that, upon first glance, seem to be adaptable to a defense use when filled with a sufficiently noxious substance. A closer look at these spray bottles reveals them to be ill-adapted to the operational needs of a portable civilian self-defense device:

U.S. Pat. No. 3,255,933 to Martin discloses a dispensing container with bellows, composed of rigid and flexible parts such that the compression of the bellows section provides a predictable and constant amount of pressurization of the contents of the container. While useful for dispensing cleaning fluids or condiments, the device in U.S. Pat. No. 3,255,933 cannot be trivially adapted to effective and comfortable use as a self-defense device due to inherent flaws in safety and ease of use. The bottle is ill-adapted to one-handed use, and when the bellows is compressed, the bottle is likely to fall from the user's grasp. In addition, the orifice of ejection of the contents is rotatable upon a screw threaded connection, such that at the time of firing it may not be facing in the expected direction. No safety device prevents accidental leakage of the contents through the cap described.

U.S. Pat. No. 4,024,992 to Schmid discloses an air atomizer bottle sprayer having a screw cap. As with U.S. Pat. No. 3,255,933, the device in U.S. Pat. No. 4,024,992 cannot be trivially adapted to self-defense use without severe compromises in safety and ease of use. While the finger contours make the direction of spray more clear, the rotary screw thread attachment introduces the possibility that the contents will be ejected in the wrong direction at the crucial moment. In addition, the entire container component is flexible and exposed, increasing the probability of accidental pressurizing of the contents. No safety mechanism for protecting against accidental discharge is provided.

U.S. Pat. No. 5,328,060 to Kersten, et al., discloses a pack for free-flowing filler of a fluid or powdered nature. As in the previously cited prior art, the device in U.S. Pat. No. 5,328,060 is more suited to dispensing a harmless substance in circumstances where reaction time and accuracy are not crucial. The overall shape is cylindrical, leading to confusion as to the direction of spray. Significantly, the safety release requires twisting the two sections of the cylinder in opposite directions, a decidedly two-handed operation.

Thus, there is a clear need for, and it would be quite advantageous to have, a fluid-ejecting self-defense device that overcomes the drawbacks of known self-defense and fluid dispensing devices, and is uniquely adapted to the operational parameters of personal civilian self-defense, specifically, low levels of lethality and user training, small size and ease of concealment, very high safety levels, and reasonable accuracy and range of fire. It would be of further advantage for the operation of such a device to be intuitive, easy, and preferably one-handed, even under stress.

SUMMARY OF THE INVENTION

The present invention is a self-defense device that ejects an aimed stream or spray of fluid. The device is designed and constructed to be extremely safe to carry and use, intuitively comfortable in fitting the user's hand, capable of forcibly ejecting a significant amount of noxious fluid to a target at a range of 12 to 16 feet, and well-protected against accidental discharge. The device of the present invention uses a minimum number of parts to achieve these design goal, and these parts are specifically configured to overcome the problems of clumsiness, uncertainty of direction of aim, lack of safety, short range, low amount of stored fluid, and suspicious gun-like appearance evidenced in the prior art.

The entire volume of the device is used for storage of the active repellant fluid, providing maximum ammunition in a volume determined by comfortable fit in a relatively small hand. This is an improvement over various devices in the prior art that often sacrifice a significant part of this potential volume for propellant, or are simply not configured as a single convex chamber. Since the chamber is completely filled with active fluid at manufacture, the discharge action is essentially 100% efficient when the device is discharged for the first time. In this initial and most crucial discharge of the device, the pressure produced by squeezing the flexible section of the chamber acts directly on an incompressible fluid without an intermediate, compressible medium such as air to moderate the amount and force of the discharge. As is consistent with the operational needs of the civilian user repelling an attack, the first use of the device provides maximum range and volume of fluid.

The present invention also overcomes the impractical gun-like profile and appearance of devices disclosed in the prior art. Outwardly the device resembles a variety of handheld devices such as cameras, phones, and radios, freeing the user from suspicion when carrying it. In addition, there are no protruding triggers that could be accidentally activated while the device is being carried in a purse or pocket.

The fluid-filled chamber is composed of two elements, a rigid section which faces the user at the time of discharge, and a flexible section which faces outwards towards a potential threat. The visual and tactile difference between these components of the chamber gives a powerful cue-to the user, making it nearly impossible to accidentally aim the device backwards at the user.

The phrase "differing tactile properties", when used within this specification and subsequent claims, refers to substantial differences in properties such as hardness, roughness, stickiness, specific gravity, and/or texture, that can be sensed when grasping an object. The device is preferably designed such that the two elements of the chamber have strongly differing tactile properties. This feature is critical to the proper use of the device under stress, in dark areas, and under severe time pressure.

The rigid section is designed to fit into the lower palm of the hand and to butt securely against the base of the user's thumb. The flexible section is contoured to the inner contours of the fingers.

The rigid section provides protection from accidental pressurizing of the contents of the chamber when the device is not in use, and therefore includes all sections of the chamber besides those necessary for pressurizing. The rigid section covers a substantial portion of the sides of the device, protecting against over-pressurizing of the chamber if pressure is applied from the sides, as would occur if the device were stepped upon. The flexible section of the chamber is configured to displace a significant amount of the contents of the chamber without entirely emptying it on the first discharge.

The device is also configured to provide tactile and visual cues to the user to grasp it in an upright position such that the nozzle is upwards. In this position there is no chance that the device will slip out of the user's grasp when the flexible section is squeezed, since a rigid section containing the nozzle remains above the flexed fingers. In this upright position, the ejection assembly works most efficiently to suction and expel the fluid in the chamber.

A further adaptation to the operational needs of the civilian self-defense user is the safety valve. This valve is part of the ejection assembly and when closed, positively prevents ejection of the noxious fluid. This valve is operable by thumb pressure without changing the grip on the device, or using the opposite hand. The valve is placed to naturally engage the thumb of the user, such that the user can carry the device comfortably in a position that affords rapid release of the safety and discharge of the device as needed.

The current invention is a self-defense device including a chamber with a rigid outer wall section, and a flexible outer wall section attached to the rigid outer wall section, an ejection assembly fixed inside and extending through the outer wall of the chamber which includes a tube extending through the chamber, and fluidly communicating therewith, and a nozzle attached to an upward end of the tube and extending through the chamber, and a noxious fluid disposed within the chamber; wherein the chamber is designed and constructed so as to be completely filled by the fluid, and in which external pressure exerted upon the flexible outer wall section increases the internal pressure of the chamber, such that the fluid is forcefully ejected out of the device through the ejection assembly and out of the nozzle.

It is a further feature of the invention that the tube is completely disposed within the chamber.

It is an additional feature of the invention that the butt of the device forms a part of the chamber.

It is a further feature of the invention that the fluid is a substantially incompressible fluid, such that a volume of the fluid introduced to the ejection assembly substantially equals a volume displacement caused by the external pressure exerted on the flexible outer wall section.

It is an additional feature of the invention that the rigid outer wall section forms substantially half of an orthogonally prismatic form rounded to conform to the palm of a hand, and the flexible outer wall section forms an opposing half of the form and that the flexible section is rounded and indented so as to substantially conform to the finger grip of a hand.

The current invention also includes a valve attached to the tube, for opening and closing it, and a lever attached to the valve and configured to alter a position of the valve.

It is an additional feature of the invention that the lever extends through the chamber with the chamber remaining hermetically sealed, affording operation of the valve external to the chamber.

It is a further feature of the invention that the noxious fluid is selected from at least one of the group consisting of mace, pepper spray, acid, ammonia, and chemical irritant.

It is an additional feature of the invention that the device is adapted to right-handed or left-handed use.

It is a further feature of the invention that the device includes a one-way valve communicating through the chamber, through which air is admitted to the chamber to return the flexible outer wall section to an initial form.

It is an additional feature of the invention that the flexible outer wall section of the chamber forms a closed chamber.

It is a further feature of the invention that the outer wall section of the chamber encloses a portion of the flexible wall section.

It is an additional feature of the invention that the overall contour of the device is substantially convex.

It is a further feature of the invention that the overall contour of the flexible outer wall section is contained within planes defined by the overall contour of the rigid outer wall section.

The current invention is a directional self-defense device including a chamber including a rigid outer wall section, and a flexible outer wall section attached to the rigid outer wall section, an ejection assembly fixed inside and communicating through the outer wall of the chamber, the ejection assembly including a tube extending through the chamber, and fluidly communicating therewith, a nozzle attached to an upward end of the tube and extending through the chamber, and a noxious fluid filling the chamber built so that external pressure exerted upon the flexible outer wall section increases an internal pressure of the chamber, such that the fluid is forcefully ejected out of the device through the ejection assembly and out of the nozzle, and wherein the rigid section and the flexible section have differing tactile properties so as to be easily distinguishable by a user.

These tactile properties may include hardness, specific gravity, stickiness, smoothness, and overall shape.

The current invention is a self-defense device including a chamber including a rigid outer wall section, and a flexible outer wall section attached to the rigid outer wall section, and an ejection assembly fixed inside and communicating through the outer wall of the chamber, the ejection assembly including a tube extending through the chamber, and fluidly communicating therewith, and a valve attached to the tube, for opening and closing the tube, and a lever attached to the valve and configured to alter a position of the valve by means of a single digit of a hand of a user grasping the device, and a nozzle attached to an upward end of the tube and extending through the chamber and a noxious fluid completely filling the chamber, such that external pressure exerted upon the flexible outer wall section increases an internal pressure of the chamber, such that the fluid is forcefully ejected out of the device through the ejection assembly and out of the nozzle.

It is an additional feature of the current invention that the valve-controlling safety lever is disposed on both right and left sides of the device for operation by a right or left digit of the user.

The current invention also specifies a method of self defense, including the following steps: providing a self-defense device including a chamber including a rigid outer wall section, and a flexible outer wall section attached to the rigid outer wall section, and an ejection assembly fixed inside and extending through the outer wall of the chamber, the ejection assembly including a tube extending through the chamber, and fluidly communicating therewith, and a nozzle attached to an upward end of the tube and extending through the chamber, and a noxious fluid completely filling the chamber; then grasping the self-defense device with the rigid chamber section butted against the palm of the hand and the base of the thumb, and the flexible chamber section held within loosely closed fingers; then aiming the device at a target, and squeezing the flexible chamber section of the device, so as to forcefully and directedly eject the noxious fluid at the target through the nozzle.

It is a further feature of the current invention that the self-defense device also includes a valve attached to the tube, for opening and closing the tube, and a lever attached to the valve and configured to alter a position of the valve by means of a single digit of a user's hand grasping the device; involving the additional step, prior to step (c), of rotating the lever so as to open the valve.

It is an additional feature of the current invention that the squeezing of the flexible outer wall section can be by means of two, and preferably three or four fingers.

It is an additional feature of the current invention that the grasping step includes grasping the self-defense device, then sensing differing tactile properties of the flexible outer wall section and rigid outer wall section, then, if necessary, reorienting the self-defense device with the flexible outer wall section in finger grasp, and the rigid outer wall section in palm of hand against base of thumb.

Further advantages and advances inherent to the invention and its preferred embodiments will be evident from the detailed drawings and the accompanying description.

DETAILED DESCRIPTION OF THE PREFERRED EMBODIMENTS

The device of the present invention is a self-defense device that forcibly squirts a stream of noxious liquid at a potential assailant. It is constructed from a flexible bladder filled with liquid which is partially covered and protected by a rigid carapace. A valve safety mechanism prevents leakage and accidental discharge of the contents.

The principles and operation of devices according to the present invention may be better understood with reference to the figures. The figures show one embodiment of the present invention. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
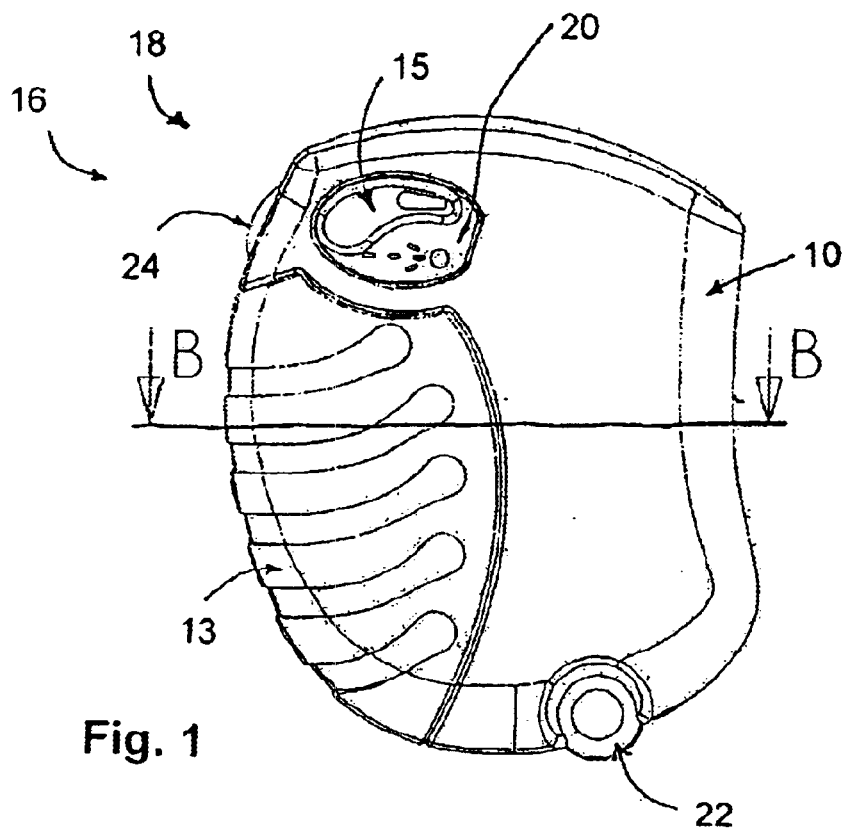
FIG. 1 shows a side view of the device of the present invention.

FIG. 1 shows a side view of the device according to the present a self-defense device according to the present invention. Self-defense device 16 can be any suitable shape. The outwardly visible components of device 16 include a rigid chamber section 10, a flexible chamber section 13, and a safety lever 15.

In the preferred embodiment depicted in FIG. 1, flexible chamber section 13 is a bladder contained within and partially covered by rigid chamber section 10. Safety lever 15 is mounted on the upper part of rigid chamber section 10 within an indentation 20 such that lever 15 can rotate through a limited arc and be set at two distinct positions within indentation 20. Also visible in FIG. 1 is ring 22 integral to device 16 and available for connection to a key ring, and a nozzle 24 for ejection of noxious fluid.

Figure 2:
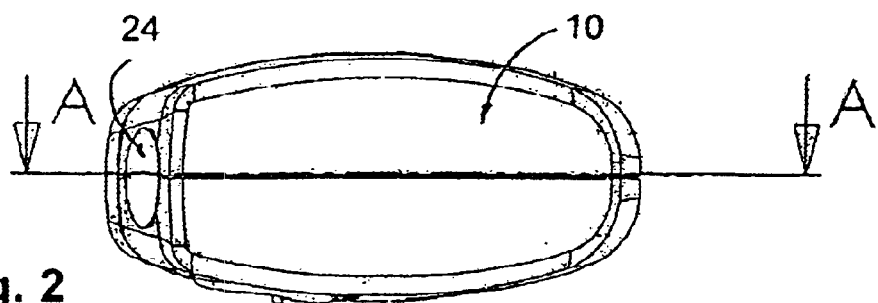
FIG. 2 shows a top view of the device of the present invention.

FIG. 2 shows a top view of a self-defense device according to the present invention. Visible in this view of self-defense device 16 are nozzle 24, rigid chamber section 10 and safety lever 15.

Figure 3:
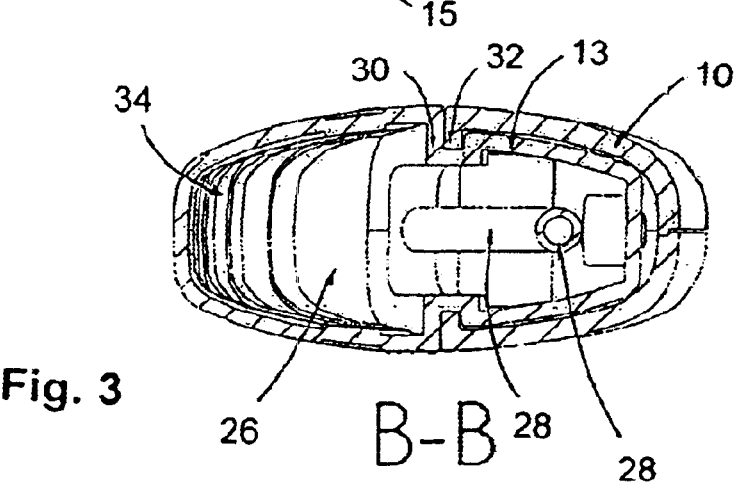
FIG. 3 shows a cross section of the device of the present invention from above as cut at line B—B shown in FIG. 1.

FIG. 3 shows a cutaway section of self-defense device 16. The cross section reveals a noxious fluid 26 contained within flexible chamber section 13. Rigid chamber section 10 surrounds the posterior portion of flexible chamber section 13 and interlocks therewith to form a secure attachment via groove 30 and rim 32. A tube 28 is seen both in top view and cross section. Finger grips 34 are visible as ridges in flexible chamber section 13.

Figure 4:
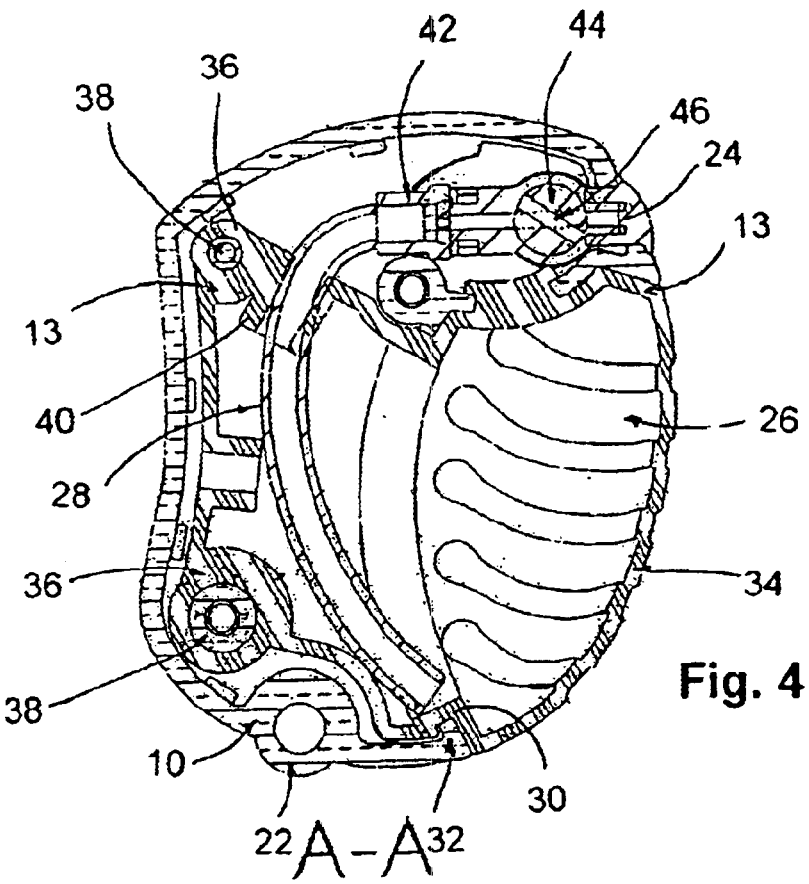
FIG. 4 shows a cross section of the device of the present invention from the side as cut at line A—A shown in FIG. 2.

FIG. 4 shows a cutaway section of self-defense device 16 as seen from the side. The section reveals the full contour of flexible chamber section 13 containing noxious fluid 26. Rigid chamber section 10 partially surrounds flexible chamber section 13 and interlocks therewith in a number of places to form a secure attachment. One such interlock is groove 30 and rim 32. In addition, collars 36 integral to flexible chamber section 13 surround spindles 38 integral to rigid chamber section 10, forming a secure attachment between the chamber sections. Flexible chamber section 13 contains a sleeve 40 through which tube 28 passes. Tube 28 is connected to fitting 42, which is connected to valve 44. Valve 44 can be set to an open or closed state. In the closed state, lever 15 is in the up position as shown in FIG. 1, closing valve 44 and preventing noxious fluid 26 from escaping self-defense device 16 and flexible chamber section. 13. Rotating lever 15 to its lower position aligns a passage 46 within valve 44 with fitting 42 and nozzle 24, allowing the forcible ejection of noxious fluid 26 through nozzle 24.

Figures 5, 6:
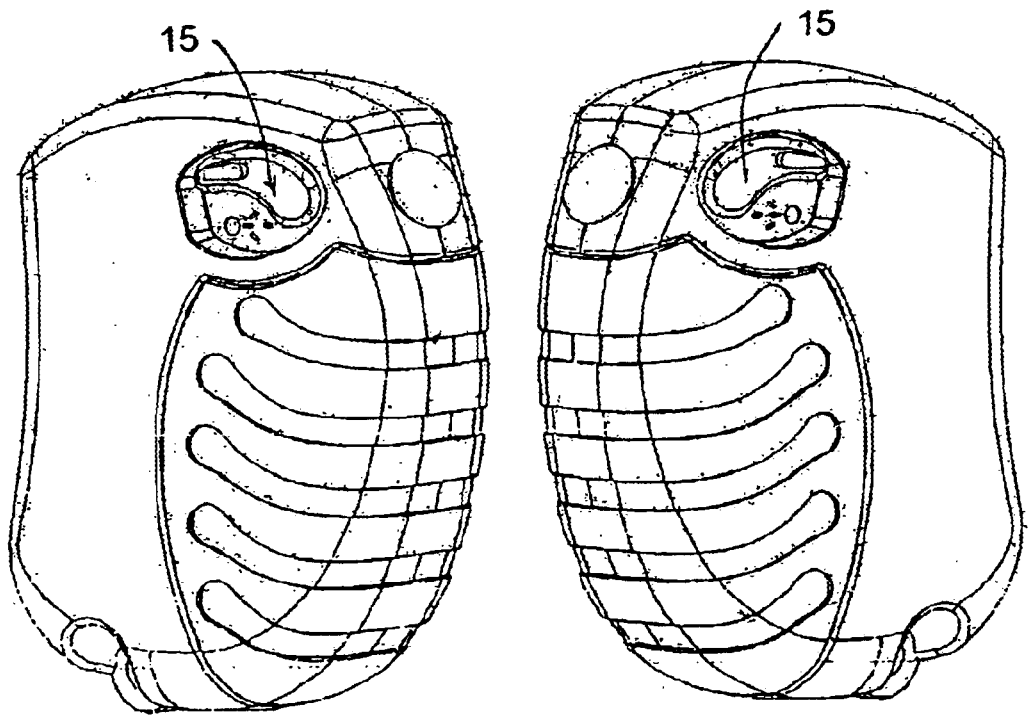
FIG. 5 shows a left oblique view of the device of the present invention.
FIG. 6 shows a right oblique view of the device of the present invention.

FIGS. 5 and 6 show right-handed and left-handed views of an alternative embodiment of self-defense device 16, in which lever 15 is installed on both sides, making device 16 usable as a one-handed device for both right and left hands.

It will be appreciated that the above examples and descriptions are intended only to serve as examples, and that many other embodiments are possible within the spirit and the scope of the present invention.

What is claimed is:

1. A self-defense device for holding in a single hand of a user, the self-defense device comprising:
   (a) a chamber including:
      (i) a rigid outer wall having a butt for bracing the device against a palm of the hand, and
      (ii) a flexible outer wall attached to said rigid outer wall, and
   (b) an ejection assembly including:
      (i) a tube extending through said chamber, and having a first end for fluidly communicating therewith;
      (ii) a valve attached to said tube, for opening and closing thereof;
      (iii) a mechanism attached to said valve and configured to alter a position of said valve using a single digit of the single hand while grasping the device in a firing position, and
      (iv) a nozzle attached to a second end of said tube and communicating with an environment external to the device,
said chamber being designed and configured such that external pressure exerted upon said flexible outer wall increases an internal pressure of said chamber, such that said fluid is forcefully and directedly ejected from the device through said tube and out said nozzle.

2. The self-defense device of claim 1, wherein said mechanism includes a lever.

3. The self-defense device of claim 1, wherein said mechanism is disposed on both right and left sides of the device, thereby enabling operation by a single digit of a right hand or by a single digit a left hand.

4. A self-defense device for holding in a hand of a user, the self-defense device comprising:
   (a) a chamber including:
      (i) a rigid outer wall, and
      (ii) a flexible outer wall attached to said rigid outer wall, said rigid wall enclosing a portion of said flexible wall, and
   (b) an ejection assembly including:
      (i) a tube extending through said chamber, and having a first end for fluidly communicating therewith, and
      (ii) a nozzle attached to a second end of said tube and communicating with an environment external to the device,
said chamber being designed and configured such that external pressure exerted upon said flexible outer wall increases an internal pressure of said chamber, such that said fluid is forcefully and directedly ejected from the device through said tube and out said nozzle.

5. The self-defense device of claim 4, wherein said flexible outer wall of said chamber forms a closed chamber.

6. The self-defense device of claim 4, wherein the self-defense device further comprises:
   (c) a handle having a rigid butt, said rigid butt encompassing at least a portion of said chamber.

7. A self-defense device for holding in a hand of a user, the self-defense device comprising:
   (a) a chamber for storing a noxious fluid;
   (b) a handle for holding the device in a firing position by the hand of the user, said handle encompassing said chamber, said handle including:
      (i) a rigid wall, and
      (ii) a flexible wall attached to said rigid wall, and
   (c) an ejection assembly disposed within the device and communicating with an environment through an outer wall of the device, said ejection assembly including:
      (i) a tube extending through said chamber, and having a first end for fluidly communicating therewith;
      (ii) a nozzle attached to a second end of said tube,
wherein said rigid wall forms a portion of an orthogonally prismatic form rounded to conform to a palm of the hand, and said flexible wall forms an opposing portion of said form, and
wherein an external pressure exerted upon said flexible wall of said handle increases an internal pressure of said chamber, such that said fluid is forcefully ejected from the device through said tube and out said nozzle.

8. The self-defense device of claim 7, wherein said rigid wall includes a butt for bracing the device against a palm of the hand.

9. A self-defense device for holding in a hand of a user, the self-defense device comprising:
   (a) a chamber for storing a noxious fluid;
   (b) a handle for holding the device in a firing position by the hand of the user, said handle encompassing said chamber, said handle including:
      (i) a rigid wall, and
      (ii) a flexible wall attached to said rigid wall, and
   (c) an ejection assembly disposed within the device and communicating with an environment through an outer wall of the device, said ejection assembly including:
      (i) a tube extending through said chamber, and having a first end for fluidly communicating therewith;
      (ii) a nozzle attached to a second end of said tube,
wherein an external pressure exerted upon said flexible wall of said handle increases an internal pressure within an entirety of said chamber, such that said fluid is forcefully ejected from the device through said tube and out said nozzle.

10. The self-defense device of claim 9, wherein said rigid wall includes a butt for bracing the device against a palm of the hand.

11. The self-defense device of claim 9, wherein said handle has a rigid butt, said rigid butt forming a part of said chamber.

12. The self-defense device of claim 9, wherein said rigid wall forms a portion of an orthogonally prismatic form rounded to conform to a palm of the hand, and said flexible wall forms an opposing portion of said form.

13. The self-defense device of claim 9, wherein said ejection assembly further includes:
  (iii) a valve attached to said tube, for opening and closing thereof, and
  (iv) a lever attached to said valve and configured to alter a position of said valve.

14. The self-defense device of claim 13, wherein said lever communicates through said chamber such that said chamber maintains a hermetic seal, thereby affording operation of said valve in an external manner with respect to said chamber.

15. The self-defense device of claim 9, wherein said noxious fluid is selected from at least one of the group consisting of mace, pepper spray, acid, ammonia, and a chemical irritant.

16. The self-defense device of claim 9, wherein said rigid outer wall encloses a portion of said flexible wall.

17. A method of self defense using a self-defense device held in a hand of a user, the method comprising the following steps:
  (a) providing the self-defense device, the device including:
    (i) a chamber including:
      (1) a rigid outer wall section, and
      (2) a flexible outer wall section attached to said rigid outer wall section;
    (ii) an ejection assembly fixed inside and communicating through said outer wall of said chamber, said ejection assembly including:
      (1) a tube extending through said chamber, and fluidly communicating therewith;
      (2) a nozzle attached to an end of said tube and communicating with an environment, and
    (iii) a fluid for filling said chamber;
  (b) grasping said self-defense device with said rigid chamber section butted against a palm of the hand and a base of a thumb of the hand, and with said flexible chamber section held within at least one finger;
  (c) aiming said device at a target, and
  (d) squeezing said flexible wall section of said device with said at least one finger, thereby increasing an internal pressure within an entirety of said chamber, such that said fluid is forcefully ejected from the device through said tube and out said nozzle.

18. The method of self-defense of claim 17, wherein step (b) includes:
  (i) grasping said self-defense device;
  (ii) sensing differing tactile properties of said flexible outer wall section and said rigid outer wall section, and
  (iii) if necessary, reorienting said self-defense device based on an identification of said differing tactile properties.

* * * * *